United States Patent [19]

Price et al.

[11] Patent Number: 5,332,292
[45] Date of Patent: Jul. 26, 1994

[54] PORTABLE PROTECTIVE CUSHION ARRANGEMENT FOR A TODDLER'S CAR SEAT

[76] Inventors: Pamela A. Price, Rte. 2, Box 617, Mosheim, Tenn. 37818; Eva D. Jones, Rte. 8, Box 233B, Greeneville, Tenn. 37743

[21] Appl. No.: 179,331

[22] Filed: Jan. 10, 1994

[51] Int. Cl.⁵ ............................................. B60N 2/28
[52] U.S. Cl. .................................. 297/488; 297/29.12; 297/256.15; 297/464; 297/397
[58] Field of Search ................... 297/216.11, 219.12, 297/256.15, 256.17, 397, 464, 485, 488; 5/655, 603

[56] References Cited

U.S. PATENT DOCUMENTS

| | | | |
|---|---|---|---|
| 4,441,221 | 4/1984 | Easte et al. | 5/655 X |
| 4,568,122 | 2/1986 | Kain | 297/488 |
| 4,695,092 | 9/1987 | Hittie | 297/219.12 |
| 4,765,685 | 8/1988 | Sudoh et al. | 297/256.15 X |
| 4,838,611 | 6/1989 | Talaugon | 297/391 |
| 4,889,388 | 12/1989 | Hime | 297/464 |
| 4,892,357 | 1/1990 | Nieto-Bushy | 297/464 |
| 5,005,903 | 4/1991 | Minardi | 297/250 |
| 5,064,245 | 11/1991 | Stephens | 297/397 |
| 5,137,335 | 8/1992 | Marten | 297/485 |

Primary Examiner—Peter R. Brown
Attorney, Agent, or Firm—Malcolm G. Dunn

[57] ABSTRACT

A portable protective cushion arrangement for positioning on a toddler's car seat detachably secured to an automobile seat the portable protective cushion arrangement having a pair of side wing cushions, each having a height approximating the height of a child sitting in the toddler's car seat, a rearward portion adapted to be positioned against the front surface of the seat back of the automobile, a lower portion adapted to be seated on top of side members of the toddler's car seat adjacent the intersection of the lower portion with the front surface of the seat back of the automobile seat, and a forward portion facing away from the front surface of the seat back of the automobile seat; a flexible strap arrangement having a predetermined length and being connected to and between the rearward portions of each side wing cushion for positioning and retaining each rearward portion at essentially right angles to the front surface of the seat back of the automobile seat, and a flexible tubular cushion of predetermined length connected to and between the forward portions of the side wing cushions at a location intermediate the height of the side wing cushions to connect the side wing cushions at a spaced distance from each other and being adapted to rest along and on top of a front support of the toddler's car seat.

11 Claims, 7 Drawing Sheets

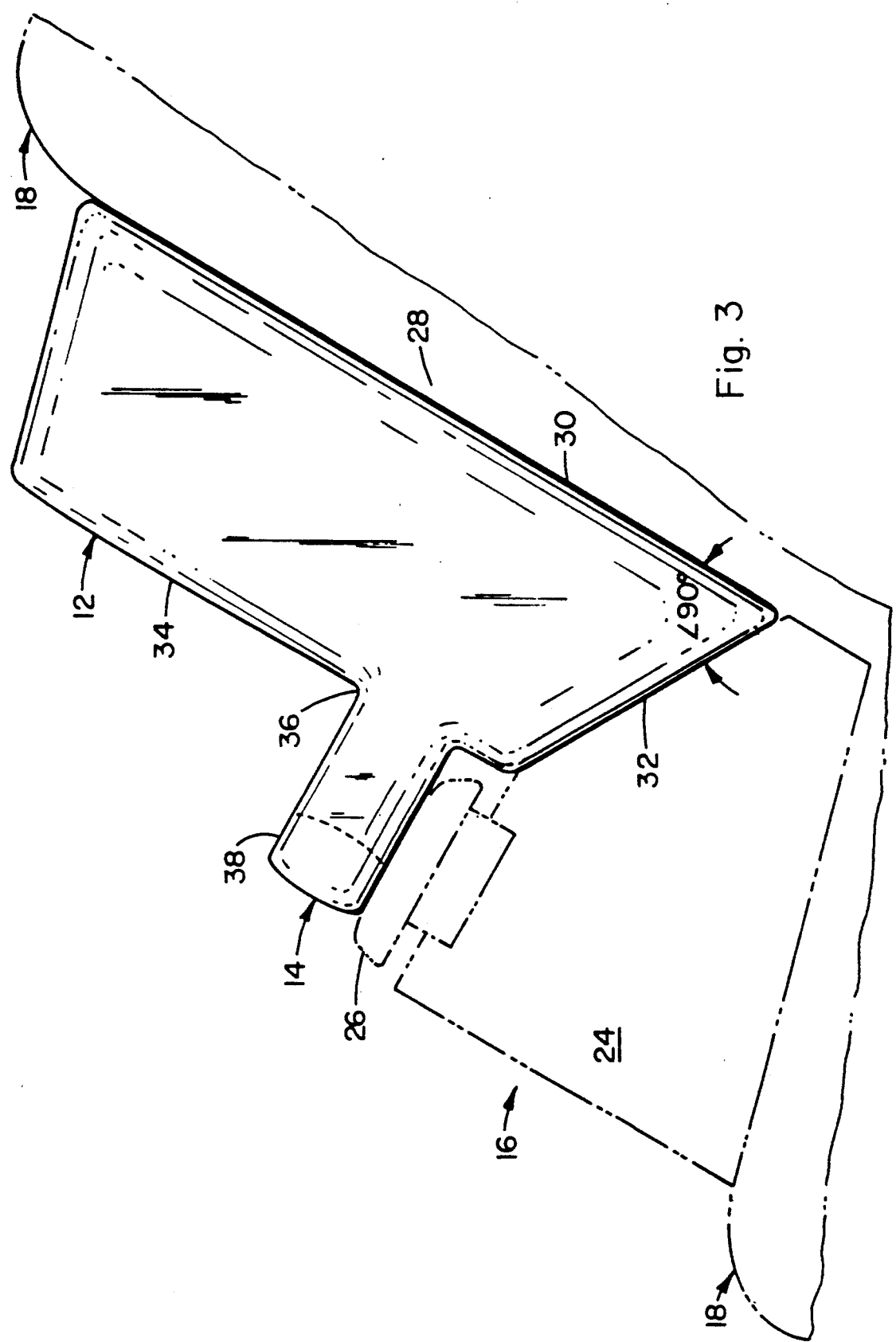

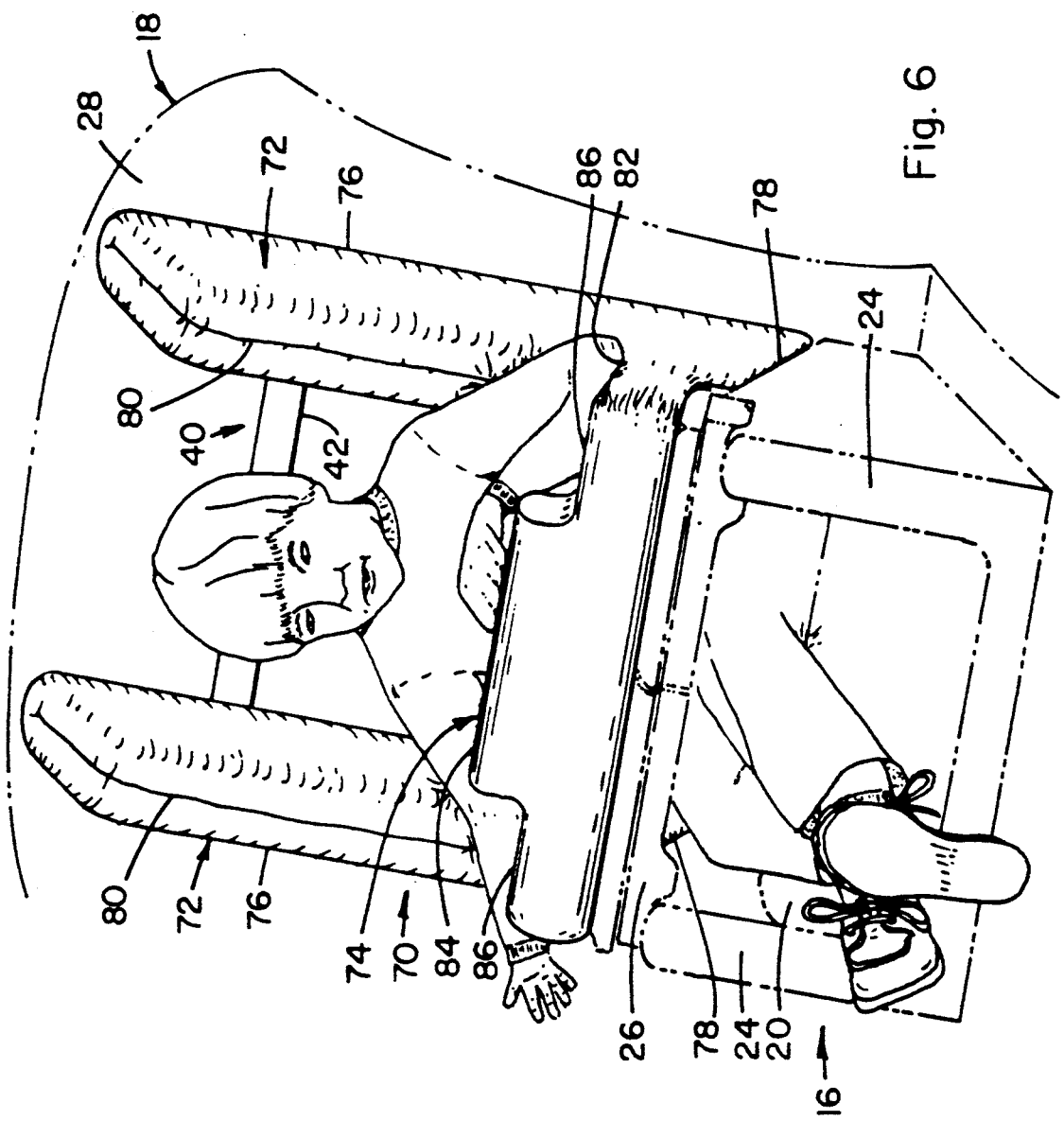

PORTABLE PROTECTIVE CUSHION ARRANGEMENT FOR A TODDLER'S CAR SEAT

BACKGROUND OF THE INVENTION

1. Field of the Invention

The present invention relates to detachable car seats or booster seats or what is often called a "toddler's car seat" that are detachably secured to an automobile seat and are for use by children when riding in a vehicle such as an automobile. The present invention is particularly directed to a portable protective cushion arrangement that is not physically connected to such booster seat or toddler's seat, but rather is positioned on the booster seat or toddler's seat and on each side of and at the front of a child sitting in the booster seat or toddler's car seat so as to protect the child from injury in the event of a vehicle accident, to protect the child from any rough places on the booster seat or toddler's seat and to provide a more enclosing cushioned support to enable the child to ride in greater comfort for short and long distances, especially while sleeping.

2. Description of the Prior Art

U.S. Pat. No. 4,568,122 discloses an example of one form of a child's toddler's seat or booster seat with which the present invention may be used. The toddler's seat or booster seat may be used by children who are beyond the infant stage, but who are still too small to use the seat belt arrangement usually provided in a vehicle such as an automobile. The booster seat described in the patent includes a seat portion on which the child sits, right and left sidewalls that are integral with and extend upwardly from the seat portion, and a back that extends between and connects the right and left sidewalls and is also connected to the seat portion. The booster seat is also provided with two opposed shields that are rotatably connected to the booster seat and are each rotatable from an open position to enable the child to be seated on the booster seat, to a mating position above the seat portion, where the shields provide arm rests for the child and also prevent the child from falling forward from the booster seat. The booster seat itself is suitably secured to the automobile seat as by the seat belts commonly provided in automobiles and similar type vehicles.

U.S. Pat. No. 4,892,357 discloses an example of a portable auxiliary seat cushion for providing upper body support for a child sitting on a chair or other support structure in the home or while riding in a moving vehicle, particularly while strapped into a seat belt or using a child's booster safety seat. The portable auxiliary seat cushion has a seat panel hinged, as by stitching, to a backrest panel. The top of the backrest panel is in the shape of an arch. An upper body support ridge is connected to and extends around the perimeter of the backrest panel and projects forwardly from the backrest panel like a large inverted "U" for supporting a child's shoulders and head when the child is seated in an upright position on the portable auxiliary seat cushion. The different panels mentioned may be covered with a washable fabric and are filled with firm but resilient material. The backrest panel and seat panel, due to the hinge arrangement therebetween, may also be positioned in a flat horizontal manner to convert into a comfortable portable mat for a child to lay on while in recumbent position. The portable auxiliary seat cushion prevents a child seated thereon in an upright position from falling sideways. The patentee contends that it will also prevent the child from falling forwardly, but it is not clear from the disclosure how this can be accomplished. It is indicated that there are two V-shaped slits, one on each end of the hinge portion, where the seat panel connects to the backrest panel, for the purpose of enabling a seat belt to pass therethrough. It is noted, however, that the location of the seat belt with respect to a seated child would be situated so low on the child that the seat belt also would not serve to prevent the upper body of the child from falling forward.

U.S. Pat. No. 5,005,903 discloses a protective cushion that is secured to a child's auto seat so as to protect passengers seated adjacent the child's auto seat from injury or discomfort from the hard, angular, or rough surfaces of the exterior of the child's auto seat. The protective cushion is a tubular construction, the longitudinal center of which is located at the top center of the child's auto seat back. Each remaining portion of the protective cushion is positioned downwardly adjacent a portion of one of the laterally, outwardly facing sides of the child's auto seat and thus serves to provide the aforementioned protection for passengers seated adjacent the child's auto seat. Two or more pairs of ties may be provided to attach the protective cushion to the child's auto seat. The ties encircle the protective cushion and frame of the child's auto seat and may be adjustably tightened to compress the cushion. This protective cushion, however, does not serve to provide any protection for the child sitting in the child's auto seat.

U.S. Pat. No. 4,889,388 discloses a collapsible, compact, lightweight seat insert, which is box-shaped. The seat insert includes a back wall, a pair of side walls, a bottom wall and a front wall having a pair of openings for accommodating an infant's legs. The seat insert may serve to support an infant or an elderly person in a sitting position to assist the infant or elderly person against tilting or slouching, thereby enabling the infant or elderly person to sit in a much more erect and comfortable position. The dimensions of the seat insert may, of course, be increased to accommodate an elderly person as distinguished from an infant, and the front wall of the seat insert that has a pair of openings for an infant's legs would, of course, be eliminated. The disclosed seat insert of the patent appears to be independent from any use with a booster seat or toddler's seat and in the manner disclosed, it would appear to serve the function of a booster or toddler's seat.

U.S. Pat. No. 4,838,611 discloses for use with an infant's car seat a car seat pillow having a pair of side cushions that are engageable with the opposite sides of a child's head and a neck cushion that is connected to and extends between the side cushions for engagement beneath the bulge of a child's head. Tether straps are provided for attaching the cushions to the shoulder straps of a car seat. The pair of side cushions and neck cushion are shown as being preferably formed as a unitary structure. The purpose of the car seat pillow is to provide support for the heads and necks of infants and other small children, especially if they fall asleep and their heads fall to one side or the other, so as to prevent discomfort in the infant's neck. The car seat pillow of the patent is also supposed to protect the child's neck in the event of an auto accident. Since the dimensions given for the height of the neck cushion are on the order of one and one-half inches and the height of the side cushions are on the order of three inches, it would be questionable that such neck cushion and side cushions would be comfortable for any length of time for a child the size of a toddler, which is the size of child contemplated for using the present invention disclosed herein.

SUMMARY OF THE INVENTION

The present invention concerns a portable protective cushion arrangement for positioning on a toddler's car seat, which is detachably secured to an automobile seat, and on each side of and at the front of a child sitting in the toddler's car seat. The toddler's car seat has a seat, a back support connected to the seat, right and left side members connected to the back support for enclosing the sides of the child, and a front support extending forwardly of and between the side members to protect the child against forward movement from the toddler's car seat.

The portable protective cushion arrangement has a pair of side wing cushions, each having a height approximating the height of a child sitting in the toddler's car seat a rearward portion adapted to be positioned against the front surface of the seat back of the automobile seat, a lower portion adapted to be seated on top of one of the side members of the toddler's car seat adjacent the intersection of the lower portion with the front surface of the seat back of the automobile seat, and a forward portion facing away from the front surface of the seat back of the automobile seat. A flexible strap arrangement of predetermined length is connected to and between the rearward portions of each side wing cushion for positioning the rearward portions at a spaced distance from each other and retaining each rearward portion at essentially right angles to the front surface of the seat back of the automobile seat.

A flexible tubular cushion of predetermined length is connected to and between the forward portions of the side wing cushions at a location intermediate the height of the side wing cushions to connect the latter at a spaced distance from each other and is adapted to rest along and on top of the front support of the toddler's car seat.

The lower portion of each side wing cushion slopes from the forward portion of the side wing cushion toward the rearward portion of the side wing cushion to define therebetween with the rearward portion an acute angle.

The flexible tubular cushion extends forwardly from each of its connections to the forward portions of the side wing cushions for a short distance and then bends at essentially right angles with respect to the side wing cushions to define an essentially parallel portion to and essentially coextensive with the length of the front support of the toddler's car seat.

In an alternate embodiment, the flexible tubular cushion extends forwardly from each of its connections to the forward portions of the side wing cushions for a short distance and then bends at essentially right angles with respect to the side wing cushions to define an essentially parallel portion to and essentially coextensive with the length of the front support of the toddler's car seat. The flexible tubular cushion then defines between each of its connections and the essentially parallel portion a reduced-in-height portion from the height of the essentially parallel portion for a child to extend an arm thereover and rest the arm thereagainst.

The flexible strap arrangement is readily connectable to and detachable from the rearward portions of the side wing cushions. The flexible strap arrangement may be a pair of flexible straps parallelly spaced apart, with each strap being readily connectable at its ends to and detachable from the rearward portions of the side wing cushions. The connection made between the flexible strap arrangement and the rearward portions of the side wing cushions may comprise a hook and loop fastener arrangement, such as a VELCRO Brand Hook and Loop Fastener.

In an alternate embodiment, the flexible strap arrangement may also be adjustably connectable to the rearward portions of the side wing cushions to change the space distance between the rearward portions of the side wing cushions.

In another alternate embodiment, the flexible strap arrangement may be a pair of straps arranged in the form of an "X" crossing each other approximately at their respective midpoints and with the respective ends of the straps being connectable to the rearward portions of the side wing cushions.

The flexible strap arrangement in still another alternate embodiment may be a single strap having a predetermined length and sufficient width to provide stability to the side wing cushions and to maintain the side wing cushions at a spaced distance and at essentially right angles with respect to the front surface of the seat back of the automobile seat.

BRIEF DESCRIPTION OF THE DRAWINGS

The details of our invention will be described in connection with the accompanying drawings, in which:

FIG. 3 is a side elevational view of the portable protective cushion arrangement and the toddler's car seat (shown in phantom lines), and illustrating the wedge effect of the lower portion of a side wing cushion between the toddler's car seat and the sloping seat back of the automobile seat (partially illustrated and in phantom lines);

FIG. 6 is a front elevational view, similar to FIG. 2, but illustrating an alternate construction of the portable protective cushion arrangement erected, installed and positioned on a child's toddler chair (shown in phantom lines) that is detachably connected to an automobile seat (partially illustrated and in phantom lines) and wherein the flexible tubular cushion that extends between and connects the rearward portions of the side wing cushions has a reduced-in-height portion near each end to enable the child to extend an arm thereover and rest its arm thereagainst, as illustrated;

DESCRIPTION OF THE PREFERRED EMBODIMENT

In reference to the drawings, initially to FIGS. 1 through 4, the portable protective cushion arrangement of the invention is shown at 10, and comprises a pair of side wing cushions 12 and a flexible tubular cushion 14 of predetermined length connected to and between the pair of side wing cushions.

The side wing cushions 12 and the flexible tubular cushion 14 are preferably covered with a suitable washable fabric, which, for example, may be cotton for its comfort and moisture wicking characteristics as well as its ready washability characteristic. The stuffing material may be a suitable washable material, which, for example, may be a polyester fiber such as is generally known as a "polyfil", to provide a firm but resilient support.

Figure 1:
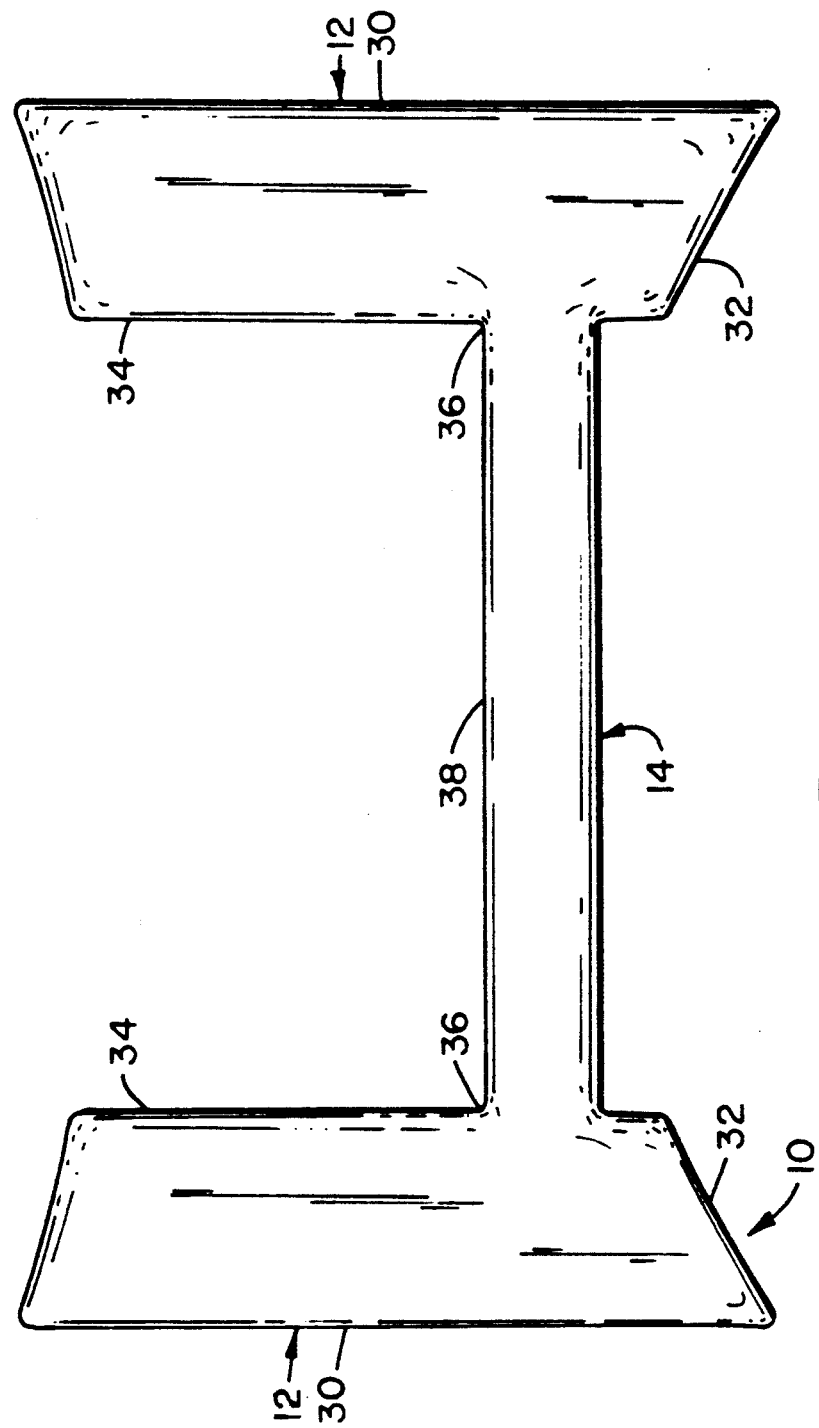
FIG. 1 is a plan view of the portable protective cushion arrangement, as it would appear when unfolded and laid in an open position on a flat surface; the flexible strap arrangement has been omitted to facilitate illustrating the invention.
Figure 2:
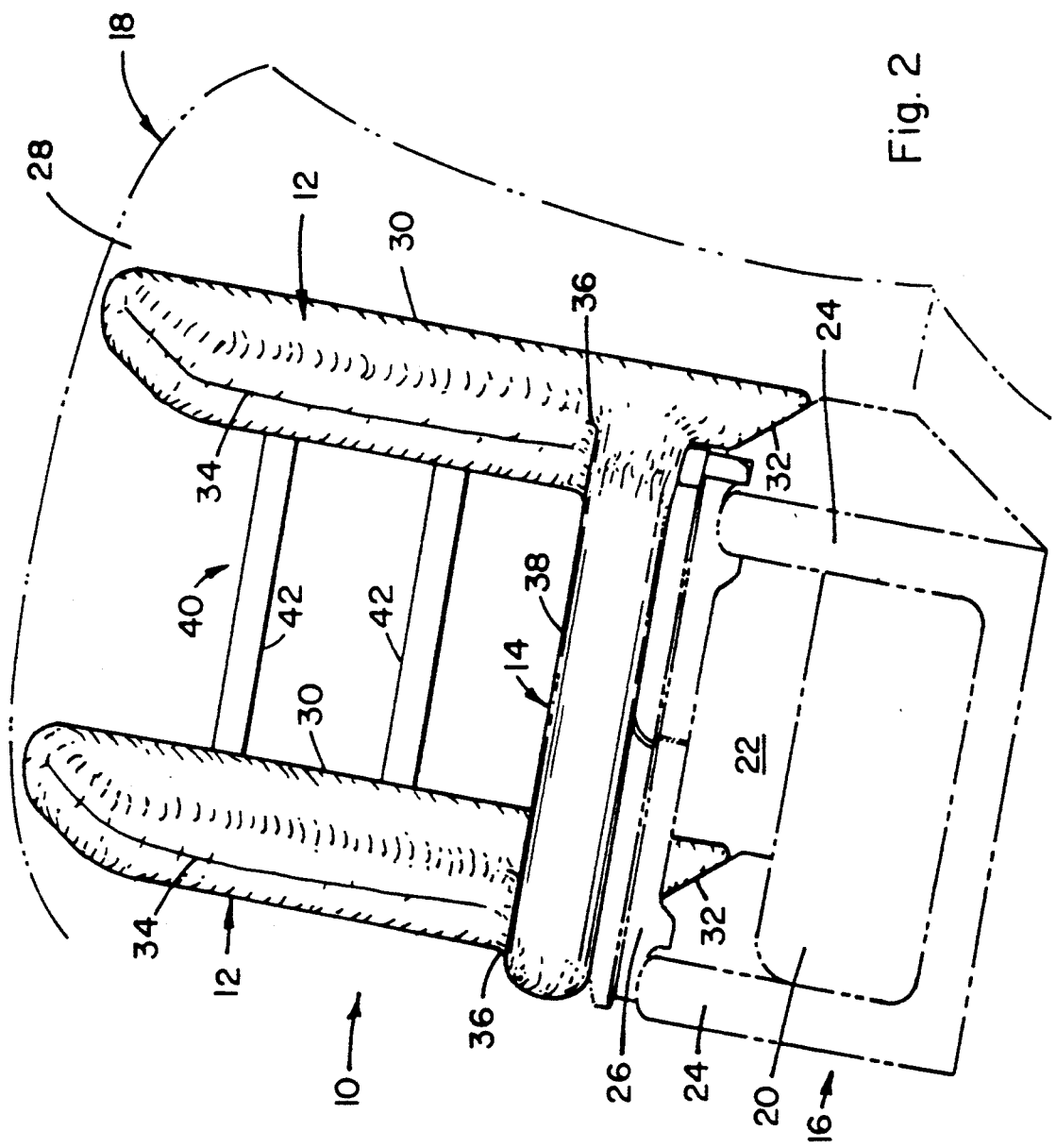
FIG. 2 is a front elevational view of the portable protective cushion arrangement erected and installed in the intended manner and positioned on a toddler's car seat (shown in phantom lines) that is detachably connected to an automobile seat (partially illustrated and in phantom lines)

In reference now to FIGS. 2 and 3, one example of a child's toddler car seat is shown at 16. A toddler's car seat is for a child who is old enough to have developed sufficient neck muscular strength to hold his or her head in the upright position when seated. Usually, when a child has reached the age of about eighteen (18) months, he or she will be able to use a toddler's car seat.

The toddler's car seat, such as the one shown in FIGS. 2 and 3, is detachably secured to an automobile seat 18, and has a seat 20, a back support 22, right and left side members 24 connected to the back support 22 for enclosing the sides of a child seated in the toddler's car seat 16, and a front support 26 extending forwardly of and between the right and left side members 24 to protect the seated child against forward movement from the toddler's car seat. As will be noted from the drawing in FIG. 2, the back support 22 of the toddler's car seat usually only extends a short distance from the seat 20 up along the child's back, enabling the front surface of the seat back 28 of the automobile seat 18 to provide the remaining support for the child's back and head.

In reference to FIG. 3, each side wing cushion 12 has a height approximating the height of a child sitting in the toddler's car seat 16. Each side wing cushion has a rearward portion 30, which is adapted to be positioned against the front surface of the seat back 28 of the automobile seat 18. The lower portion 32 of a side wing cushion 12 is adapted to be seated on top of one of the side members 24 of the toddler's car seat 16 adjacent the intersection of the lower portion 32 with the front surface of the seat back 28 of the automobile seat 18. The forward portion 34 of each side wing cushion faces away from the front surface of the seat back 28 of the automobile seat 18.

Each lower portion 32 of a side wing cushion 12 slopes from the forward portion 34 of the side wing cushion toward the rearward portion 30 of the side wing cushion to define between the forward portion and the rearward portion an acute angle, i.e. an angle less than 90 degrees. As may be observed from FIG. 3, the slope of the lower portion acts as a wedge between the toddler's car seat 16 and the sloping front surface of the seat back 28 of the automobile seat to hold the portable protective cushion arrangement 10 in position on the toddler's car seat.

The flexible tubular cushion 14 connects to and between the forward portions 34 of the side wing cushions 12 at a location intermediate the height of the side wing cushions to connect the pair of side wing cushions at a spaced distance from each other, and is adapted to rest along and on top of the front support 26 of the toddler's car seat 16. As may be noted from the drawings, the flexible tubular cushion 14 extends forwardly from each of its connections 36 to the forward portions 34 for a short distance and then bends at essentially right angles with respect to the side wing cushions to define an essentially parallel portion 38 to and essentially coextensive with the length of the front support 26 of the toddler's car seat 16.

Figure 4:
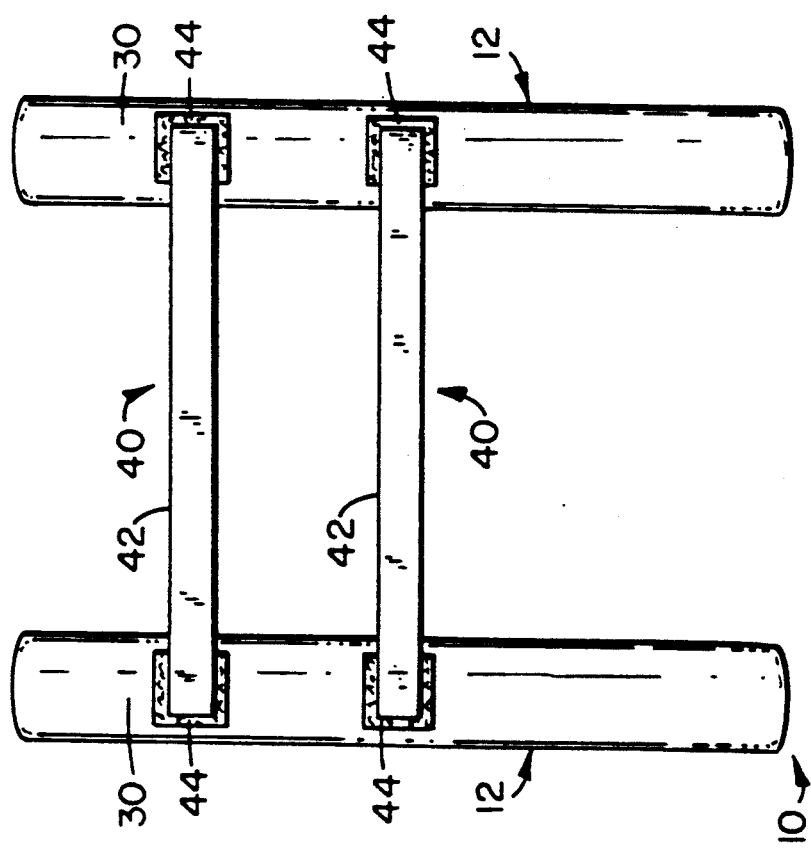
FIG. 4 is a rear elevational view of the portable protective cushion arrangement, and illustrates a pair of parallelly spaced flexible straps connected to and between the rearward portions of the side wing cushions at a spaced distance from each rearward portion.

A flexible strap arrangement 40 of predetermined length is connected to and between the rearward portions 30 of each of the side wing cushions 12, as shown, for example, in FIG. 4, so as to position the rearward portions of the side wing cushions at a spaced distance from each other and to retain each rearward portion at essentially right angles to the front surface of the seat back 28 of an automobile seat 18.

In the manner disclosed, therefore, the body of the child, when the child is seated in the toddler's car seat, also cooperatingly serves along with the wedge effect of the sloping lower portion of the side wing cushions to hold the portable protective cushion arrangement 10, which surrounds the child, in position on the toddler's car seat 16.

In a preferred embodiment, the flexible strap arrangement comprises a pair of parallel straps 42 parallelly spaced sufficiently apart from each other when connected to the side wing cushions 12 so as to provide stability to and maintain the side wing cushions at essentially right angles with respect to the front surface of the seat back 28 of the automobile seat 18. The pair of straps are also of such length so as to provide a predetermined spaced distance between the respective rearward portions 30 of the side wing cushions. Preferably also, the actual connection made to the rearward portions 30 of the side wing cushions is a hook and loop fastener arrangement whereby either the strip or pad on which are mounted the hooks is suitably secured to each end of a flexible strap 42 on one side thereof (not illustrated), and the strip or pad 44 (note FIG. 4) on which are mounted the loops is suitably secured on each of the rearward portions 30 of the side wing cushions, or vice versa. In this manner, and depending upon the side of the toddler's car seat 16 from which a child enters the car seat 16, the flexible straps 42 on that side may be readily disconnected from the rearward portion of the side wing cushion on that side, and then readily reconnected after the child is seated in the toddler's car seat 16. The hook and loop fastener, such as the VELCRO Brand Hook and Loop Fastener, is well-known in the art. The hooks and loops per se are too small, as a practical matter, to illustrate.

Figure 7:
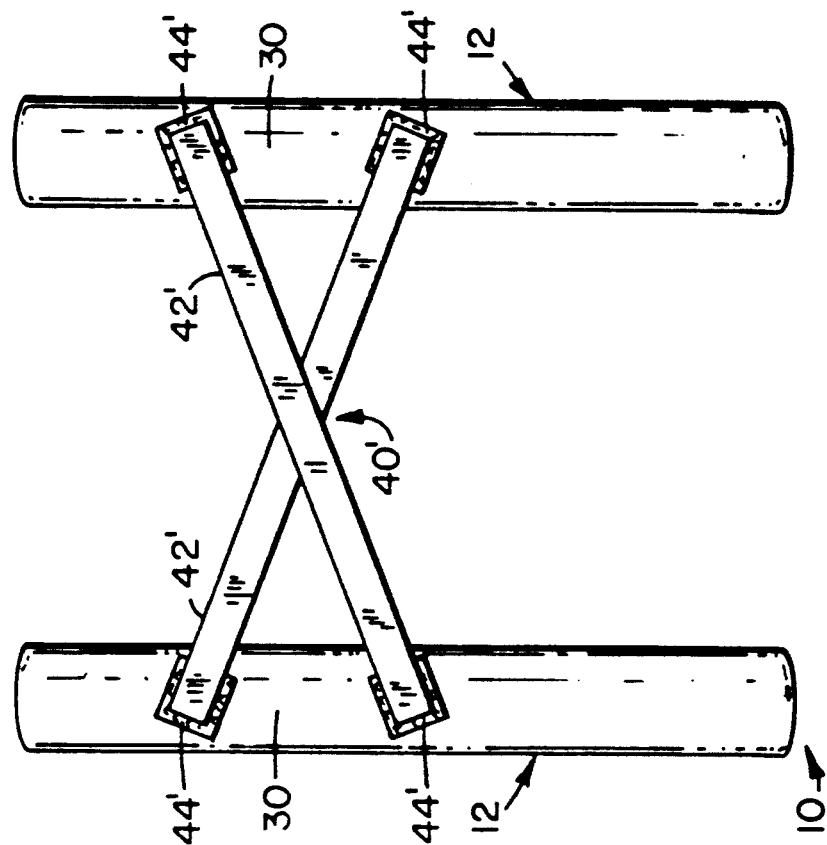
FIG. 7 is a rear elevational view of an alternate embodiment of the flexible strap arrangement, as may be employed on the embodiment shown in FIG. 1, illustrating the flexible straps arranged in the form of an "X" crossing each other at their respective midpoints.

An alternate flexible strap arrangement 40', as shown in FIG. 7, may be employed in which the flexible straps 42' have a predetermined length and are arranged in the form of an "X", crossing each other approximately at their respective midpoints. In this arrangement, each flexible strap 42' may also be suitably secured at its midpoint to the midpoint of the other flexible strap. The respective ends of the straps are connectable to the rearward portions of the side wing cushions, as by the aforementioned hook and loop fastener.

Figure 8:
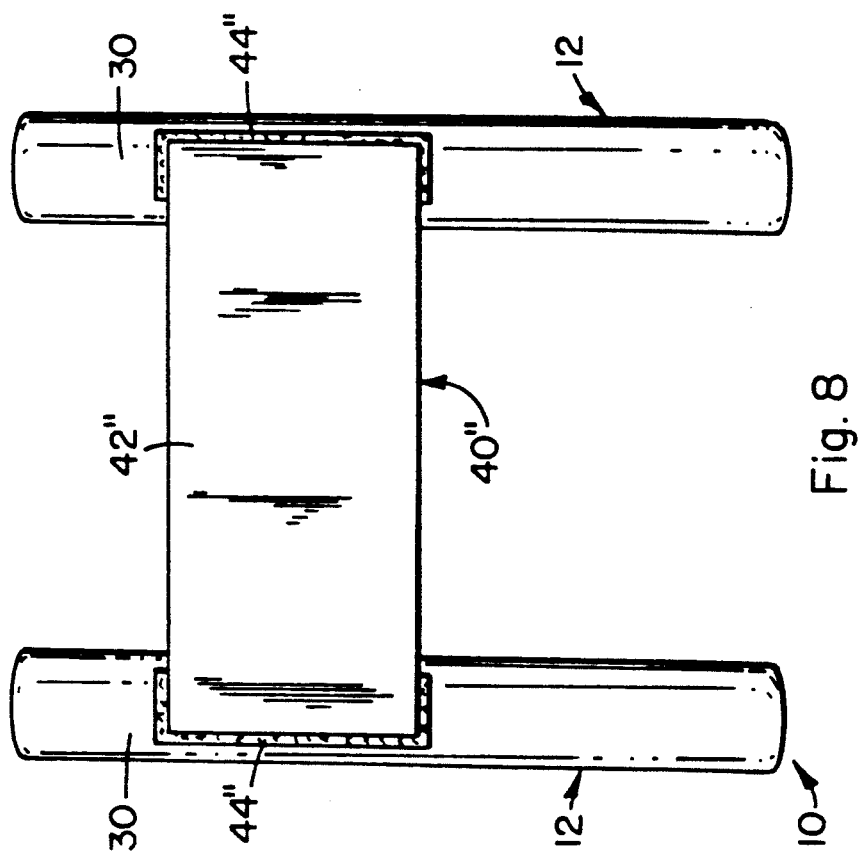
FIG. 8 is a rear elevational view of another alternate embodiment of the flexible strap arrangement, as may be employed on the embodiment shown in FIG. 1, illustrating a single strap having a wide width.

Another alternate flexible strap arrangement 40", as shown in FIG. 8, may be employed in which there is a single flexible strap 42" having a predetermined length and being sufficiently wide enough to provide the necessary stability to the side cushions and to maintain them at a spaced distance from each other and at essentially right angles with respect to the front surface of the seat back 28 of the automobile seat 18. The respective ends of the single flexible strap 42" may also be connectable to the rearward portions 30 of the side wing cushions 12 by a hook and loop fastener, as previously described.

Figure 9:
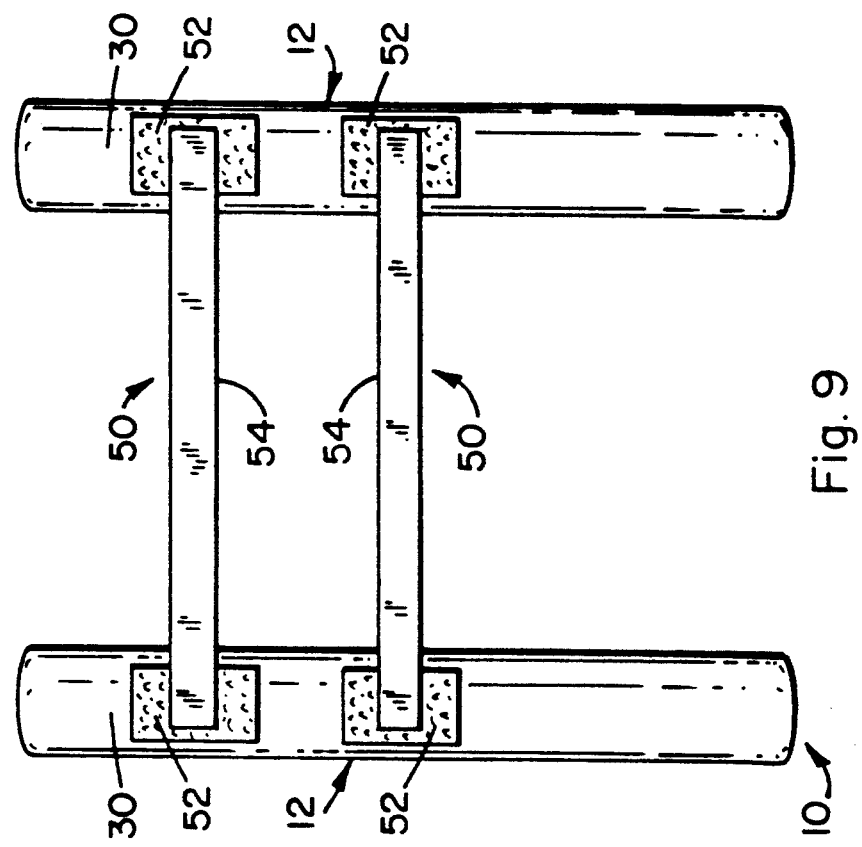
FIG. 9 is a rear elevational view of still another alternate embodiment of the flexible strap arrangement, as may be employed on the embodiment shown in FIG. 1, to illustrate how the flexible straps may be adjustably connectable to the rearward portions of the side wing cushions.

Still another alternate flexible strap arrangement 50 of predetermined length is shown in FIG. 9, in which the strip or pad 52 on which are mounted the loops of the fastener secured to the rearward portions 30 of the side wing cushions 12 is sufficiently wide or long as to enable the hooks of the fastener on one side of the ends of a flexible strap 54 to be adjustably connectable along the width or length of the strip or pad 56 of loops to the respective rearward portions 30 of the side wing cushions 12 so as to change the spaced distance between the rearward portions by means of the connections per se. It will, of course, be recognized that instead of the loops of the fastener being on the rearward portions of the side wing cushions, the hooks of the fastener could be on such rearward portions and be on a strip or pad of such width or length as to enable the loops of the fastener on the ends of the flexible strap to be adjustably connectable along the width or length of the strip or pad of hooks of the fastener to the rearward portions of the side wing cushions. The purpose of such adjustable connection would be to change the spacing enough between the respective rearward portions of the side wing cushions so as to accommodate a child having either a larger or smaller body for its age in use of the toddler's car seat 16.

It will be recognized that this adjustable connection between the hooks and loops of the fastener could be applied also to the other alternate embodiments shown herein.

ALTERNATE CONSTRUCTION OF THE PORTABLE PROTECTIVE CUSHION ARRANGEMENT

Figure 5:
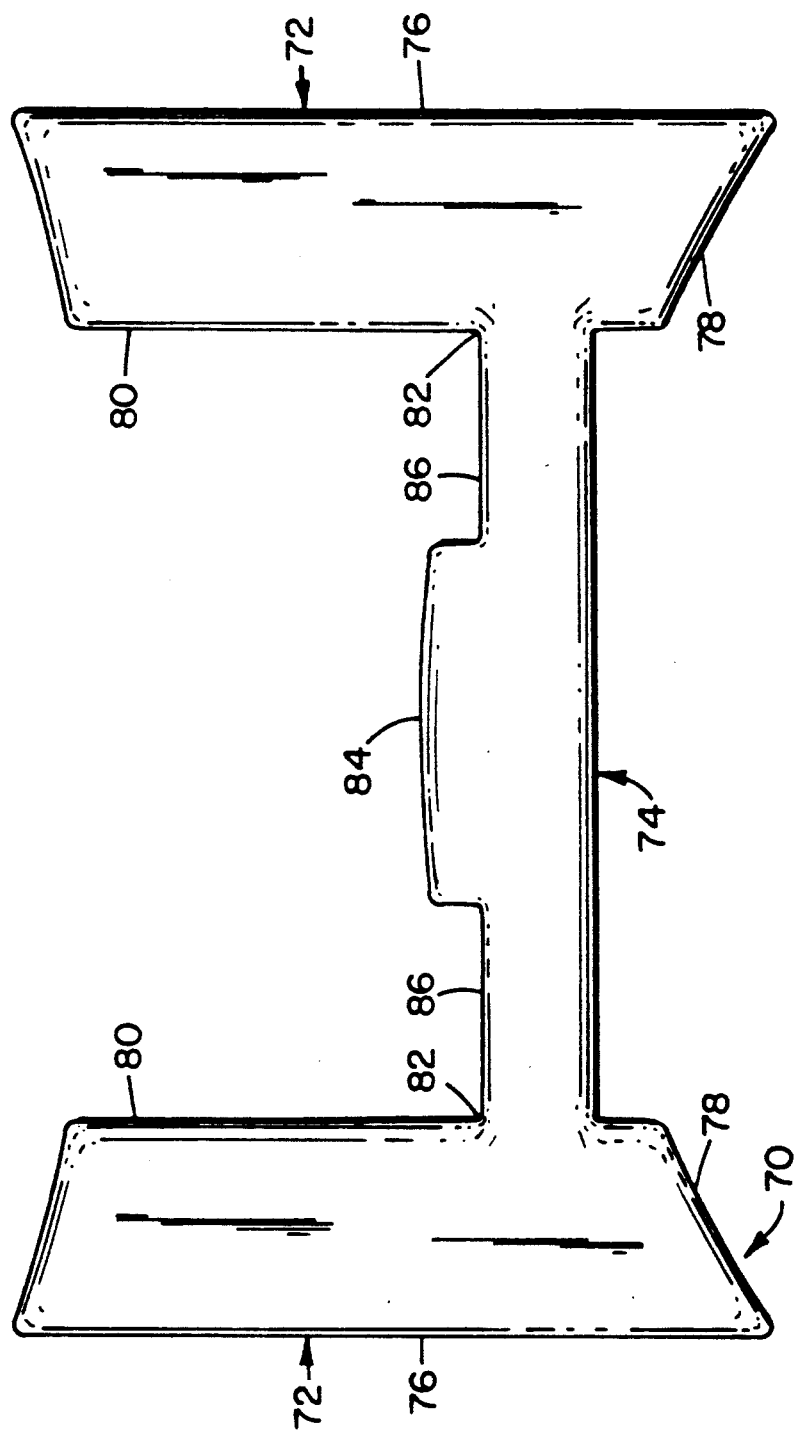
FIG. 5 is a plan view of an alternate construction of the portable protective cushion arrangement as it would appear when unfolded and laid in an open position on a flat surface; the flexible strap arrangement has been omitted to facilitate illustration of the invention.

In FIG. 5, an alternate construction of the portable protective cushion arrangement is shown at 70. It comprises a pair of side wing cushions 72 and a flexible tubular cushion 74 of predetermined length connected to and between the pair of side wing cushions. Each side wing cushion 72 has a rearward portion 76, which is adapted to be positioned against the front surface of the seat back 28 of the automobile seat 18. The lower portion 78 of a side wing cushion 72 is adapted to be seated on top of one of the side members 24 of the toddler's car seat 16 adjacent the intersection of the lower portion 78 with the front surface of the seat back 28 of the automobile seat 18. The forward portion 80 of each side wing cushion faces away from the front surface of the seat back 28 of the automobile seat 18.

Each lower portion 78 of a side wing cushion 72 slopes from the forward portion 80 of the side wing cushion toward the rearward portion 76 of the side wing cushion to define between the forward portion and the rearward portion as acute angle, i.e., an angle less than 90 degrees. As mentioned with respect to the first described embodiment and illustrated in FIG. 3., the slope of the lower portion of this alternate construction also acts as a wedge between the toddler's car seat 16 and the sloping front surface of the seat back 28 of the automobile seat 18 to hold the portable protective cushion arrangement 70 in position on the toddler's car seat.

In this alternate construction, all elements of the construction are identical with the elements of the first described embodiment except as to the flexible tubular cushion 74. It also extends from each of its connections 82 to the forward portions 80 of the side wing cushions 72. It then bends at essentially right angles with respect to the side wing cushions to define an essentially parallel portion 84 to and essentially coextensive with the length of the front support 26 of the toddler's car seat 16. Between each of the connections 82 and the essentially parallel portion 84, there is a reduced-in-height portion 86 from the height of the essentially parallel portion 84 for a child to extend an arm thereover and rest it thereagainst, as may be observed from FIG. 6.

Obviously, the different constructions of flexible strap arrangements described herein will also function in the same manner with this alternate construction as they will with the first described embodiment.

The invention has been described in detail with particular reference to preferred embodiments thereof, but it will be understood that variations and modifications can be effected within the spirit and scope of the invention.

We claim:

1. A portable protective cushion arrangement for positioning on a toddler's car seat detachably secured to an automobile seat, said protective cushion arrangement located on each side of and at the front of a child sitting in said toddler's car seat and wherein said toddler's car seat has a seat, right and left side members connected to said toddler's car seat for enclosing the sides of said child, and a front support extending forwardly of and between said side members to protect the child against forward movement from said toddler's car seat; said portable protective cushion arrangement comprising:

a pair of side wing cushion means, a rearward portion for positioning against the front surface of the seat back of said automobile seat, a lower portion for sitting on top of one of said side members of said toddler's car seat adjacent the intersection of the lower portion with the front surface of the seat back of said automobile seat, and a forward portion facing away from the front surface of the seat back of said automobile seat;

flexible strap means of predetermined length connected to and between the rearward portions of each said side wing cushion means for positioning said rearward portions at a spaced distance from each other and for retaining each said rearward portion at essentially right angles to said front surface of the seat back of said automobile seat; and flexible tubular cushion means having a predetermined length and being connected to and between said forward portions of said side wing cushion means at a location intermediate the height of said side wing cushion means to connect the latter at a spaced distance from each other and for resting along and on top of said front support of said toddler's car seat.

2. A portable protective cushion arrangement as defined in claim 1, and wherein said lower portion of each said side wing cushion means slopes from said forward portion toward said rearward portion of each said side wing cushion to define therebetween with said rearward portion an acute angle.

3. A portable protective cushion arrangement as defined in claim 1, and wherein said flexible tubular cushion means extends forwardly from each of its connections to said forward portions of said side wing cushion means for a short distance and then bends at essentially right angles with respect to said side wing cushion means to define an essentially parallel portion to and essentially coextensive with the length of said front support of said toddler's car seat.

4. A portable protective cushion arrangement as defined in claim 1, and wherein said flexible tubular cushion means extends forwardly from each of its connections to said forward portions of said side wing cushion means for a short distance and then bends at essentially right angles with respect to said side wing cushion means to define an essentially parallel portion to and essentially coextensive with the length of said front support of said toddler's car seat, and defining between said each of its connections and said essentially parallel portion a reduced-in-height portion from the height of said essentially parallel portion for a child to extend an arm thereover and rest said arm thereagainst.

5. A portable protective cushion arrangement as defined in claim 4, and wherein the connection made between said flexible strap means and rearward portions of said side wing cushion means comprises a hook and loop fastener means.

6. A portable protective cushion arrangement as defined in claim 1, and wherein said flexible strap means is readily connectable to and detachable from said rearward portions of said side wing cushion means.

7. A portable protective cushion arrangement as defined in claim 1, and wherein said flexible strap means is readily connectable to and detachable from said rearward portions of said side wing cushion means and is also adjustably connectable to said rearward portions of said side wing cushion means to change said spaced distance between the rearward portions of said side wing cushion means.

8. A portable protective cushion arrangement as defined in claim 1, and wherein the connection made between said flexible strap means and rearward portions of said side wing cushion means comprises a hook and loop fastener means.

9. A portable protective cushion arrangement as defined in claim 1, and wherein said flexible strap means comprises a pair of parallel flexible straps, each flexible strap being readily connectable at its ends to and detachable from said rearward portions of said side wing cushion means at locations spaced on said rearward portions from said other flexible strap.

10. A portable protective cushion arrangement as defined in claim 1, and wherein said flexible strap means comprises a pair of straps arranged in the form of an "X", crossing each other approximately at their respective midpoints.

11. A portable protective cushion arrangement as defined in claim 1, and wherein said flexible strap means comprises a single strap having a predetermined length and sufficient width to provide stability to said side wing cushion means and to maintain said side wing cushion means at a spaced distance from each other and at essentially right angles with respect to the front surface of the seat back of said automobile seat.

* * * * *